Feb. 16, 1932.    M. HALLEAD    1,845,147
WEIGHING SCALE
Filed Sept. 30, 1927    2 Sheets-Sheet 1

INVENTOR.
Mervil Hallead
BY
ATTORNEYS.

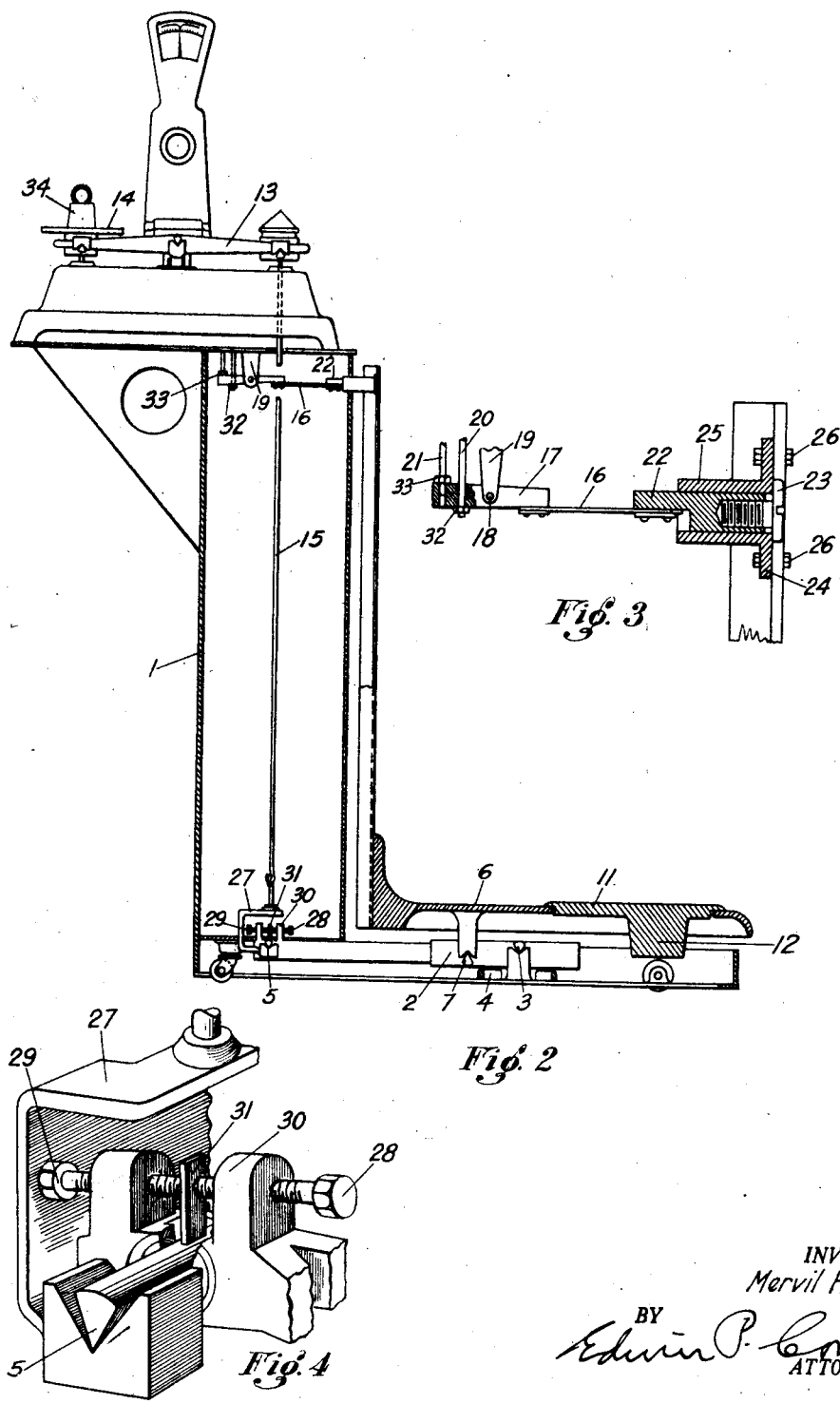

Patented Feb. 16, 1932

1,845,147

UNITED STATES PATENT OFFICE

MERVIL HALLEAD, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed September 30, 1927. Serial No. 223,157.

My invention relates to weighing scales and has to do with a weighing scale wherein commodities in large amounts may be weighed with the aid of an ordinary over and under weight indicating scale.

In the types of scales heretofore used in determining the weight of a large amount of a commodity, the percentage of error in the scales has been such as to make the scales costly to use. This has resulted from the face that the ratio, in such scales, between the known counterbalance weight and the desired weight of the commodity usually has been, approximately, one to one hundred or, in other words, a commodity weight of one hundred pounds on one part of the scale was necessary to offset the effect of one pound of weight on another part of the scale.

It will be apparent that, with such a large ratio between the known weight and the commodity weight necessary to offset its effect on the scale, a slight variation in the known weight would cause a large degree of difference in the weight of the commodity. Obviously, this would result in a necessary increase in the amount of the commodity, since the known weight grows heavier instead of lighter, due to dust and other foreign matter collecting on or about the known weight, to bring the scale to a position of equilibrium.

A novel feature of my invention resides in the fact that the scale mechanism is so arranged that the ratio between the known weight and the weight of the commodity necessary to counterbalance it is such that small variation in the known weight will not cause a large percentage of error in the desired weight of the commodity.

Another novel feature of my invention lies in the adjustments that I have provided in order to obtain the exact desired ratio between the known weight and the weight necessary to offset its effect on the movements of the scale mechanism.

A further novel feature of my invention resides in the fact that I have provided a frictionless check rod and have provided means whereby this check rod may be adjusted to exact parallelism with the beam of the scale. Furthermore, I have so constructed this check rod that there can be but two stresses upon the rod, these being the stresses of flexion and tension.

Other novel features of my invention may be seen in the following detailed description and the preferred embodiment of my invention is shown in the accompanying drawings wherein similar characters of reference designate corresponding parts and wherein Figure 1 is a perspective view, with parts broken away, showing the preferred embodiment of my invention.

Figure 2 is a side view, partly in section, showing the small over and under weight indicating scale at right angles to the remainder of the mechanism, the entire scale, which includes the small over and under weight indicating scale, being identically the same as the scale shown in Figure 1.

Figure 3 is a side view, partly in section, of the novel form of check rod which I employ.

Figure 4 is a perspective view of an adjustable bearing that forms a part of the preferred embodiment of my invention.

Figure 1:
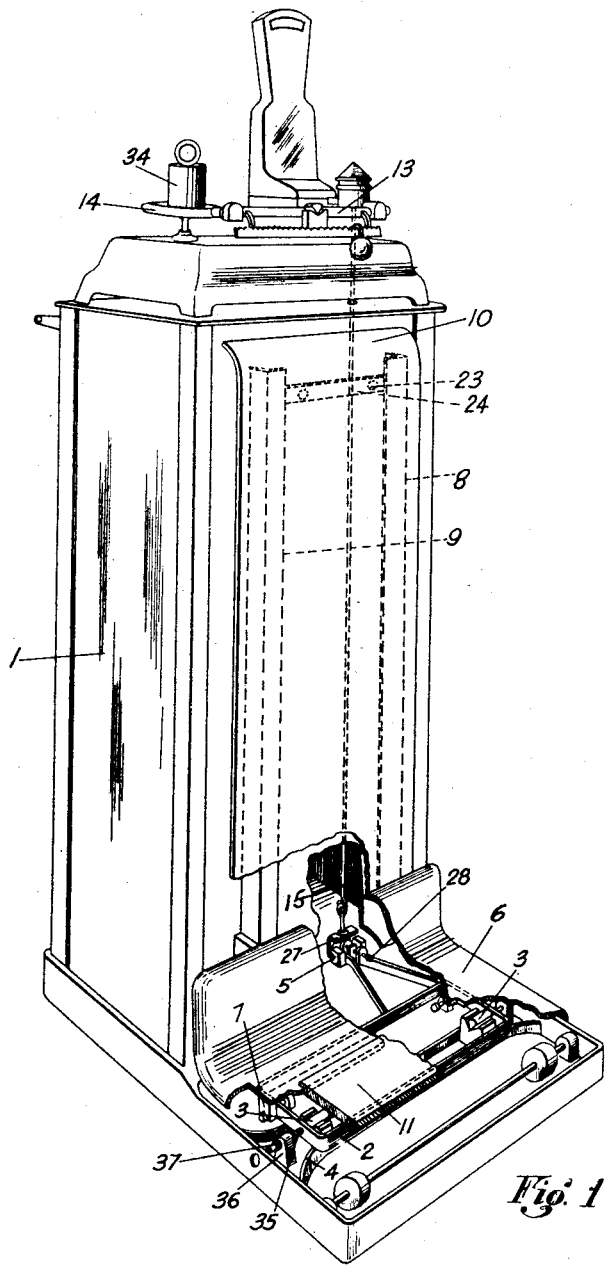

With reference to Figures 1 and 2 of the drawings, the numeral 1 represents a housing for a portion of the scale mechanism. This housing is preferably constructed in the manner shown in these figures wherein it consists of a vertical and horizontal portion.

The lower portion of the scale mechanism comprises a single multiple lever 2 which is fulcrumed on the horizontal portion of the housing 1 by means of the knife-edge bearing structure 3. The knife-edge portion of this knife-edge bearing structure 3 forms an integral part of the single multiple lever 2 and the remainder of this knife-edge bearing structure is mounted upon cross-pieces 4 that extend horizontally across the base of the housing 1 (see Figure 1). A nose iron pivot structure is mounted upon the extreme outer end of the single multiple lever 2. Such nose iron pivot structure will hereinafter be described in detail.

A platter or pan 6 is mounted upon the single multiple lever 2 by means of a knife-edge structure 7. This platter or pan 6 preferably takes the form shown in Figures 1 and 2 wherein it comprises a horizontal and a vertical portion, the supporting pivot for these portions being adjacent their juncture or, at least, nearer the vertical portion than its opposite edge. The vertical portion of the platter or pan extends upwardly along the vertical length of the housing 1 and comprises the angle irons 8 and 9 and a plate or other covering 10 attached thereto. A check rod structure, which will hereafter be more fully described, holds the vertical portion of the platter or pan 6 in its proper position with relation to the housing 1. A removable cover or lid 11 is provided in the horizontal portion of the platter or pan 6 and a counterweight 12 forms an integral part of this cover or lid. The purpose of the counterweight is to offset the weight of the vertical portion of the platter or pan, which is on the opposite side of the supporting pivot, and maintain the vertical portion of the platter or pan upright.

An ordinary type of over and under weight indicating scale is mounted upon the top of the housing 1, as shown in Figures 1 and 2, and comprises the usual even balance beam 13. The usual weight pan 14 is mounted upon one end of this even balance beam and the opposite end has a steelyard rod 15 depending therefrom to form a connecting link between the even balance beam 13 and the lower part of the scale mechanism hereinbefore described.

The check rod structure, as shown in Figures 2 and 3, comprises a wire 16 fastened at one end to a flat casting 17 in the manner shown in Figure 3, or in any other well-known manner. This flat casting 17 is fulcrumed as at 18 to an arm or ear 19 that extends downwardly from the top of the housing 1. Threaded bolts 20 and 21, that also extend downwardly from the top of the housing 1, extend through the rearwardmost end of the flat casting 17 and have nuts 32 and 33 thereon to provide a means for adjusting the check rod structure to a position of parallelism with respect to the beam of the scale.

The opposite end of the wire 16 is rigidly attached to a casting 22 that is preferably circular in cross-section. This casting is slidably mounted within a casting 25 that has an inner periphery corresponding in cross-sectional shape to the outer periphery of the casting 22 and is rigidly attached to the cross-arm 24 by the bolts 26, as shown in Figure 1. Screw bolts 23 extend through openings in the cross-piece 24, as shown in Figures 1 and 3, and are threaded into the casting 22. The heads of these screw bolts bear against one of the casting 25, as shown in Figure 3. With such construction, it will be apparent that, if the vertical portion of the platter or pan 6 moves inwardly at its top, there will be no compression stress on the check rod wire 16, since the casting 25 will merely slide inwardly on the casting 22.

The nose iron pivot structure comprises a knife-edge bearing 5, the knife-edge portion of which is movable about its axis. Screw bolts 28 and 29 extend through ears 30 which form an integral part of the single multiple lever 2. The inner ends of the screw bolts 28 and 29 bear against opposite sides of a plate 31 which forms an integral part of the knife-edge portion of the bearing structure and extends upwardly therefrom. The remainder of the bearing structure takes the form of a yoke 27 which provides a means of connecting the steelyard rod 15 and the nose iron pivot 5.

In the operation and adjustment of this scale, the over and under weight scale which is mounted upon the top of the housing 1 is adjusted so that the indicator thereof points to a zero position on the dial. Then, the check rod 16 is adjusted upwardly or downwardly by tightening and loosening the nuts 32 and 33 on the bolts 20 and 21 until the check rod is in exact parallelism with the single multiple lever 2. It will be understood that the over and under weight indicating scale is properly adjusted after connection has been made between one end of the beam of this scale and the single multiple lever 2.

At this time, a suitable known weight, such as the weight shown at 34 in Figures 1 and 2, is placed upon the pan 14 of the over and under weight scale and a known weight that is in proper ratio with the weight 34 is placed on the platter or pan 6. At this time, the knife-edge portion of the nose iron pivot structure 5 is tilted inwardly or outwardly by means of retracting one of the screw bolts 28 and 29 and extending the other until the ratio of the distance between the nose iron bearing structure 5 and the lever fulcrum point 3 and the distance between the platter or pan supporting pivot 4 and the fulcrum point 3 of the single multiple lever 2 is exactly the same as the ratio between the weight 34 and the weight placed upon the platter or pan 6.

An important feature of my invention resides in the fact that I have provided means for taking the lateral thrust of the platter or pan 6 which is adjustable to compensate for wear. This is accomplished by means of screws 35 which extend through ears 36, mounted upon the cross-pieces 4, and bear against the opposed ends of the pivots 3 of the single multiple lever 2. Similar means may be provided for taking the lateral thrust of the platter or pan 6 on its supporting pivots 7. It will be clearly seen that, by first retracting one of these screws and extending the other, suitable compensation may be made for the wear on the thrust portion of the pivots. I have provided lock nuts 37 which may be tightened to hold these screws in their desired position.

To those familiar with the art, it will be apparent that I have provided a scale for weighing commodities in large amounts in which there is a relatively low ratio between the known weight element and the commodity weight necessary to offset its effect on the scale mechanism and that I have accomplished this in a novel manner.

A novel and important feature of my invention takes the form of a nose iron pivot that is adjustable to cause the ratio of the distance between the nose iron bearing and the single multiple lever fulcrum bearing and the distance between the platter or pan supporting bearing and the single multiple lever fulcrum bearing to be equal to the ratio between the known weight and the commodity weight necessary to offset its effect on the movements of the scale mechanism.

Another novel and important feature of my invention resides in the fact that I have provided a frictionless check rod that is adjustable to a position of parallelism with the single multiple lever of the scale. This check rod structure is such as to prevent any stresses on the rod but those of flexion and tension, means having been provided to prevent the stress of compression.

Various changes may be made in the details of my scale without departing from the scope of my invention. For instance, as shown in Figure 2, the over and under weight indicating scale that forms a part of the entire scale might be so positioned and the parts so arranged that the even balance beam and the single multiple lever would be in parallelism, irrespective of the extent of their movement whereupon the completed scale would weigh correctly, regardless of the level of the scale.

Having thus described my invention, what I claim is:

1. In a weighing scale, a single multiple lever, an even balance beam having a steelyard rod connected thereto, said steelyard rod being connected to said lever by means of a bearing which is tiltable to vary the mechanical advantage.

2. In a weighing scale, a single multiple lever, an outwardly extending nose iron on said lever and a bearing on said nose iron, said bearing being tiltably adjustable to vary the mechanical advantage.

3. In a weighing scale, a commodity pan having a base and a portion substantially perpendicular thereto, said commodity pan having its base pivotally supported during weighing nearer the vertical portion than its opposite edge.

4. In a weighing scale, a pivotally mounted commodity pan having a check rod attached thereto, and means for maintaining said check rod in a state of tension, said means comprising a weight element disposed on the opposite side of the pivotal mounting of said commodity pan from said check rod.

5. In scale construction, a lever, an L-shaped receiving platter having its base eccentrically pivoted upon said lever whereby such platter will tend to tilt in one direction, and a flexible check rod for resisting such tilting action.

6. In a platform scale, a lever, a platform comprising a horizontal portion, and a vertical portion constructed to preclude the commodity from touching any portion of the scale excepting the platform, the platform being eccentrically pivoted on said lever to ensure application of all the commodity weight to the weighing lever.

7. In a weighing scale, a single multiple lever, a commodity pan pivotally mounted on said lever, a nose iron pivot structure on that end of said lever that is furthest removed from the fulcrum point and a steelyard rod connected to said nose iron pivot.

8. In a weighing scale, a single multiple lever, an even balance beam, a commodity pan pivotally mounted on said lever, a nose iron pivot on that end of said lever that is farthest removed from its fulcrum point and a steelyard rod forming a connection between said single multiple lever and one end of said even balance beam.

9. In a weighing scale, a single multiple lever, an even balance beam, a commodity pan pivotally mounted on said lever, a nose iron pivot on that end of said lever that is furthest removed from its fulcrum and a flexible connection between said lever and said even balance beam.

10. In a weighing scale, a housing, a single multiple lever, an even balance beam, a commodity pan having a horizontal and a vertical portion pivotally mounted on said lever, a check rod connection between the vertical portion of said commodity pan and said housing and a flexible connection between said single multiple lever and said even balance beam.

11. In a platform scale, a pivotally mounted horizontal platform, said platform having a portion thereof extending vertically on one side of the pivotal mounting and a removable weight panel on the other side thereof.

In testimony whereof I, hereby, affix my signature.

MERVIL HALLEAD.